Jan. 8, 1952  S. L. SCUDDER  2,582,073
PHOTOELECTRIC PLOTTING DENSITOMETER
Filed Jan. 8, 1948  4 Sheets-Sheet 1
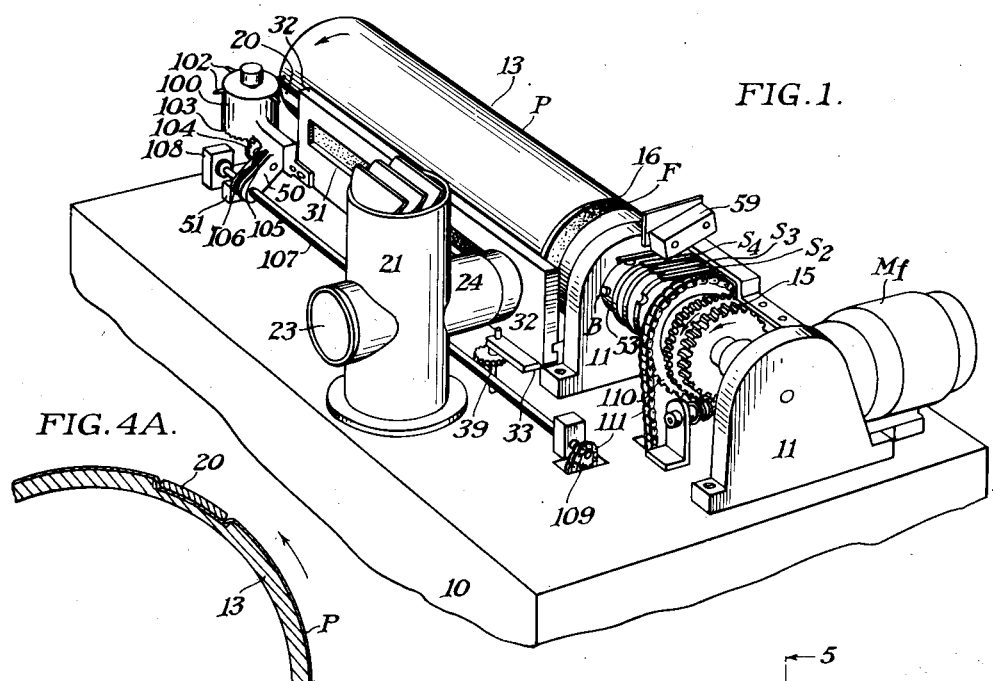
FIG. 1.
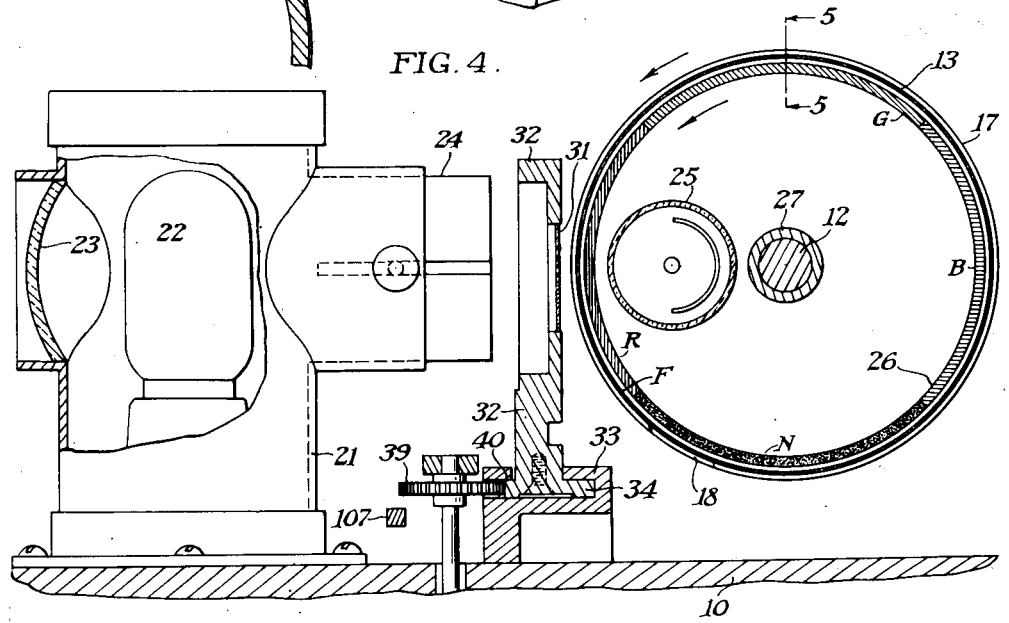
FIG. 4A.
FIG. 4.
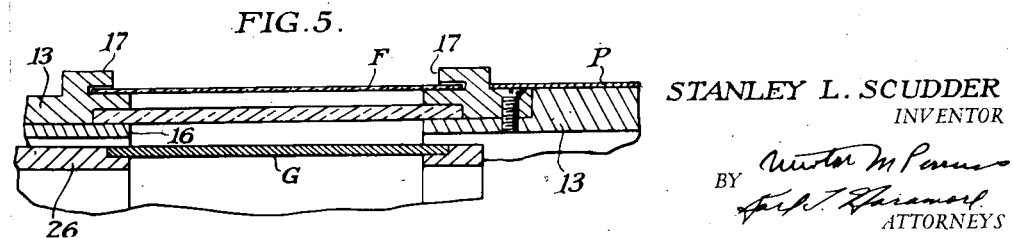
FIG. 5.
STANLEY L. SCUDDER
INVENTOR
BY
ATTORNEYS Jan. 8, 1952 S. L. SCUDDER 2,582,073
PHOTOELECTRIC PLOTTING DENSITOMETER
Filed Jan. 8, 1948 4 Sheets-Sheet 2

STANLEY L SCUDDER
INVENTOR

BY
ATTORNEYS

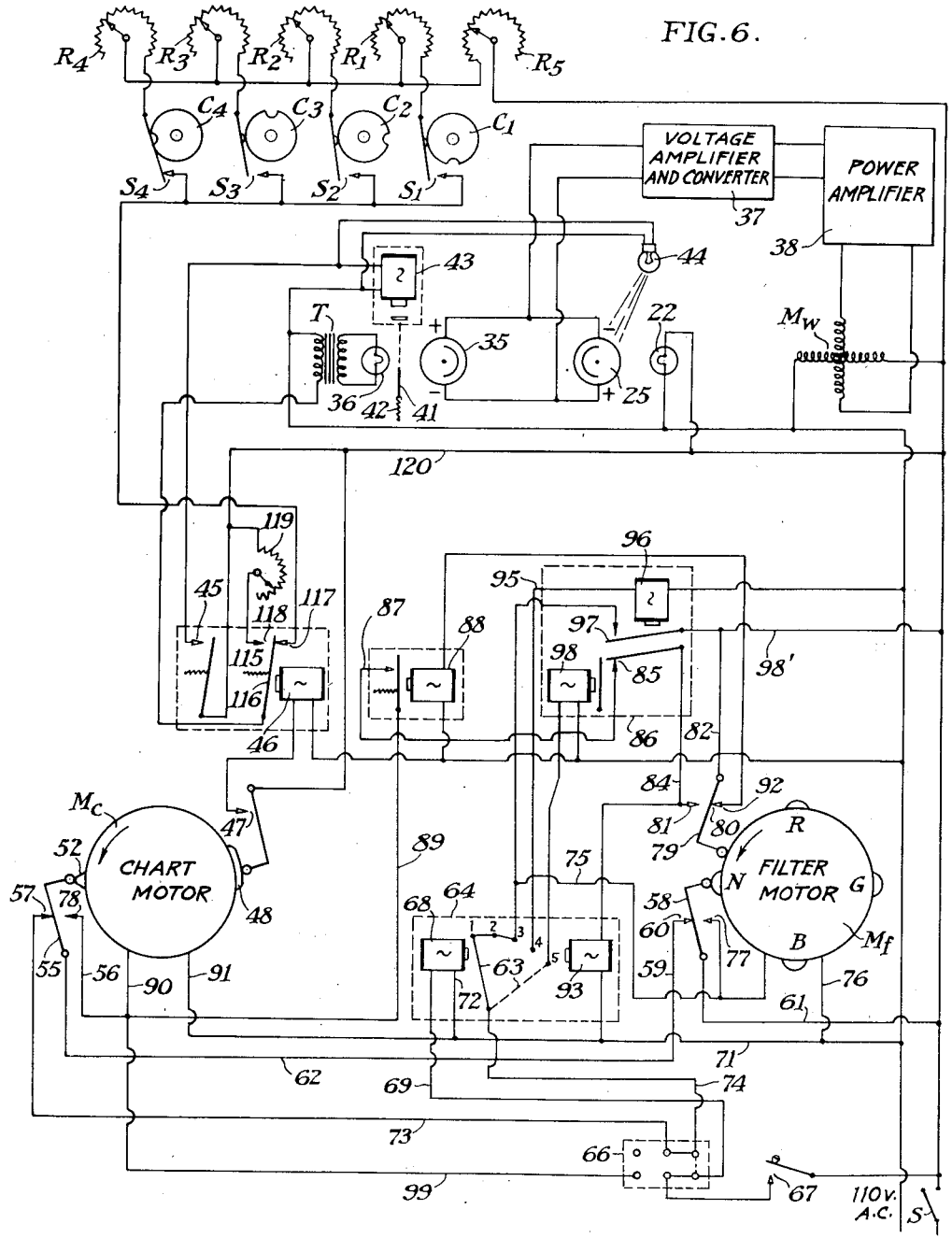

Jan. 8, 1952 S. L. SCUDDER 2,582,073
PHOTOELECTRIC PLOTTING DENSITOMETER
Filed Jan. 8, 1948 4 Sheets-Sheet 4

STANLEY L. SCUDDER
INVENTOR
BY
ATTORNEYS

Patented Jan. 8, 1952

2,582,073

UNITED STATES PATENT OFFICE 2,582,073

PHOTOELECTRIC PLOTTING
DENSITOMETER

Stanley L. Scudder, Rochester, N. Y., assignor to
Eastman Kodak Company, Rochester, N. Y., a
corporation of New Jersey Application January 8, 1948, Serial No. 1,163

14 Claims. (Cl. 346—33)

The present invention relates to densitometers and particularly to an automatic plotting densitometer which is adapted to measure the color and/or neutral density of a sensitometrically exposed testing strip of color film and plot the density values against the log E (exposure) of the successive points along the strip.

It is well known in the art to provide densitometers for measuring both color and neutral densities of a sensitometer strip of film. However, the majority of these known densitometers measure the density of successive points along the test strip, visually or photoelectrically, individually, and the data must be read from a suitable scale, or meter, and then plotted on a suitable graph, point-by-point, by the operator. With densitometers of this type, considerable time is consumed in making a complete measurement of a test strip, especially if the three-color densities of a tri-pack color film are required, and, because of this, these instruments are not suitable for use in the production control of color prints where the processing must be checked continuously. Furthermore, these known instruments depend upon the operator to read and/or plot correctly the data supplied by the instrument, and, since the human element enters into the results, either as to obtaining the proper adjustment of the instrument, if it be a visual one; or in transcribing the data to the graph, if it be a photoelectric one, inaccuracies enter into the results because of the human element.

Accordingly, one object of the present invention is to provide an automatic plotting densitometer which will measure the density of successive points along a sensitometer film strip and simultaneously plot the results against the corresponding log E of the strip independently of an operator.

Another object is to provide a densitometer of the type set forth which can be used to measure either the neutral density of a black-and-white film, or the neutral and/or color densities of a color film.

A further object is to provide a densitometer of the type set forth which will measure the color densities of each of the three different colors of a color film successively in an automatic manner and plot them on the same graph; this being done exclusively of supervision by the operator after the instrument is once loaded with a sheet of graph paper and a sensitometer strip of film and a start button is pulsed.

Still another object is to provide a densitometer of the type set forth having an indexable multi-color stylus for marking the graph paper with marks corresponding in color to the color density being measured, and which stylus is connected with an indexable color filter movable into the measuring light beam so that the density values for a given color will be plotted in a color corresponding to the color density being measured.

A further object is to provide a plotting densitometer of the type set forth which is photoelectrically controlled and can measure the density of a test strip in a continuous and rapid manner whereby the device is adaptable for use in production control of color prints.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings, in which Fig. 1 is a perspective view of a plotting densitometer constructed in accordance with a preferred embodiment of the present invention;

Fig. 4 is an enlarged end view of the densitometer, partially in section and partially in elevation, and showing the means for illuminating the sensitometer strip mounted on the chart drum and showing the indexable color filter drum within the chart drum adapted to be indexed into position in front of the measuring photocell;

Fig. 4A is a sectional detail of a portion of the chart drum and showing how the ends of the chart, wrapped around the drum, are held by a spring clip extending longitudinally of the drum;

Fig. 5 is a sectional view taken substantially on line 5—5 of Fig. 4 and showing how the test or sensitometer strip is mounted on the chart drum in measuring position;

Fig. 6 is a diagrammatic representation of the combined electrical and mechanical control system of a preferred embodiment of the present invention;

Like reference characters refer to corresponding parts throughout the several views of the drawing.

Figure 2:
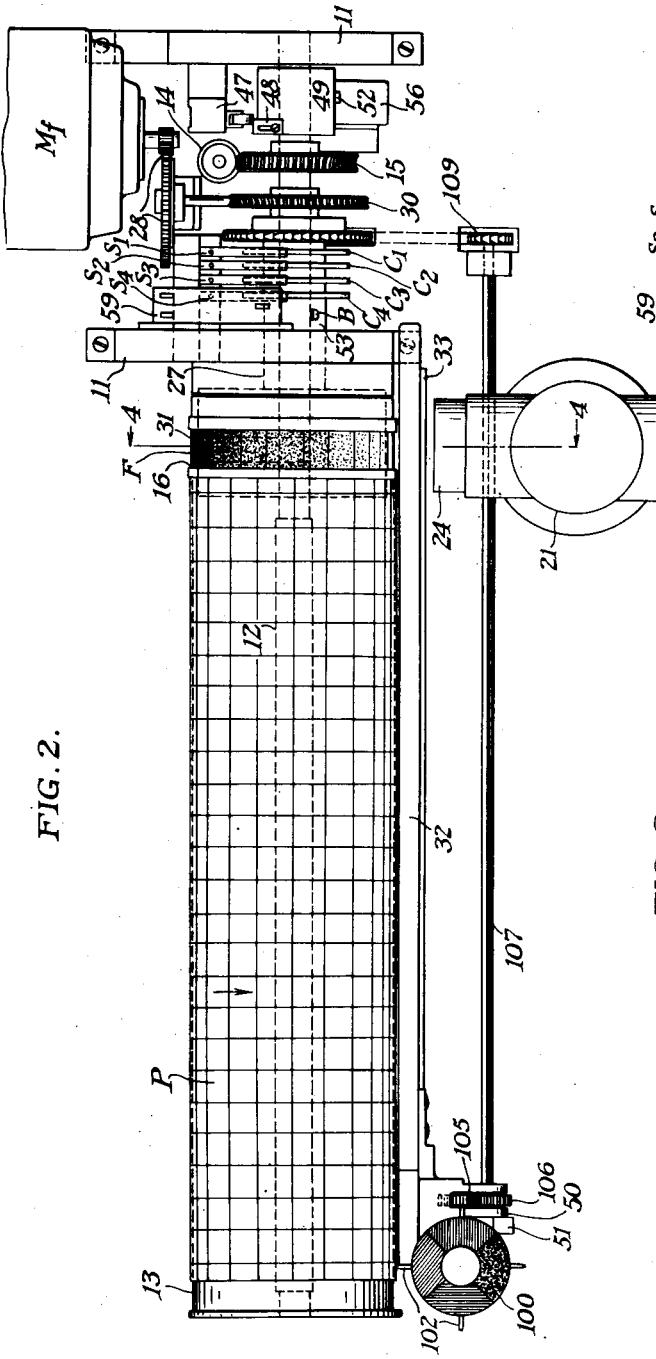
Fig. 2 is a top plan view of the essential elements of the instrument shown in Fig. 1.

According to the present invention, a sensitometer strip of the film to be tested is made and is continuously moved through a measuring light beam in front of a photoelectric measuring cell. Since the density of a sensitometer strip varies from a minimum to a maximum in known regulated increments, as is well known, the output of the light-sensitive cell would continuously decrease as the strip was moved through the beam in a direction such that its density increased. If the intensity of the light beam is continuously adjusted, so as to keep the output of the light-sensitive cell constant, then the adjusted position of the light intensity varying means necessary to cause this equalization of the output on the measuring cell will be an indication of the density of the test strip of that point in the light beam at any instant.

While different means of adjusting the intensity of the measuring light beam can be utilized, i. e., diaphragm, rheostat, etc., I have found that for an automatic continuous plotting instrument of the present type a continuous density wedge, movable through the beam, is ideal. In the present instance, this density wedge is in the form of a straight longitudinal scale movable lengthwise across the beam in front of the measuring cell. At any instant the cell output is equal to a given value, the longitudinal position of the density wedge, relative to the light beam, is a measure of the density of that portion of the sensitometer strip in the light beam at that instant.

This feature is made use of to provide a plotting densitometer by wrapping the sensitometer strip around one end of a driven drum to be moved through the light beam in a vertical direction. A sheet of graph, or chart, paper having one coordinate calibrated in log E values, and the other coordinate in density values is wrapped around the drum with the log E coordinate extending around the drum in the direction of the test strip. Preferably, the test strip is mounted so that its end, having the minimum density, is in the light beam at the starting position of the drum and correspondingly the chart paper is disposed so that the low end of the log E coordinate is in substantial axial alignment on the drum with this end of the test strip.

The density wedge starts from a position where its most dense end is in the light beam and then moves lengthwise as the sensitometer strip is moved through the beam in order to keep the intensity of the beam, striking the measuring cell, balanced at a given value. Accordingly, the longitudinal position of the wedge at any instant is a measure of the density of the test strip in the beam at that instant, so that by connecting a stylus to the wedge to be moved therewith along the density coordinate of the chart paper on the drum, this stylus will plot the density curve directly on the chart paper in proper relation to the log E coordinate.

This instrument is rendered continuous and automatic by having the density wedge moved by a motor whose direction and extent of drive is controlled by the output and polarity of a closed circuit loop which includes the measuring photocell and a standard source of potential connected in opposition thereto. So long as the output of the measuring photocell is equal to a given value, as determined by the standard source of potential, no current will flow from the closed circuit loop and the wedge-driving motor will not receive power. When this condition exists, the wedge is in a position to indicate the density of that portion of the test strip in the light beam. Should the output of the measuring cell increase above the given value, current will flow from the closed circuit loop of such polarity as to cause the motor to drive in the proper direction to move the wedge to change the intensity of the beam to overcome this unbalanced condition. In other words, as the more-dense portions of the test strip move into the beam, the wedge must be moved so that less-dense portions thereof move into the beam. While the wedge drive motor and its control is adapted to drive the wedge in both directions, in accordance with the polarity of any current leaving the closed circuit loop, since, in the present instance, the denser portions of the sensitometric strip are successively moved into position, the polarity and output of the closed loop circuit will be such as to drive the motor in a direction to move the less-dense areas of the wedge successively into the light beam. The control circuit for the wedge driving motor is sufficiently rapid in response so that the density measurement can be carried out accurately while the sensitometer strip is continuously moved.

For the purpose of measuring the color density of a three-color film, there is provided an indexable filter drum and means for indexing the different color filters into the light beam. The drives for the chart drum, the filter drum, and the density wedge are such that after each rotation of the chart drum, signifying the measurement of the density of the sensitometer strip for neutral or one color, depending upon the position of the filter drum, the filter drum is indexed to move the next color filter into position; the wedge is returned to its start position to correspond with the sensitometer strip and the chart drum is then automatically started to measure the density of the strip for another color. This cycle is automatically repeated until the density of the strip is measured for each color, whereupon the instrument stops and remains stopped until a new sheet of chart paper and a new sensitometer strip are placed on the drum and a start button is pulsed.

So that the curves on the graph paper will correspond in color to the color density being measured, a multi-color stylus is provided which is indexable to bring the different-colored styli into operative position successively. The indexing mechanism of the styli is connected to the indexing mechanism of the filter drum so that the two will be indexed together, whereby the stylus, in operative position at any time, will correspond in color to the density of the strip being measured.

Referring now to the drawings wherein a preferred embodiment of the present invention is shown, the plotting densitometer, according to my invention, comprises a housing 10, on the top of which there are two spaced supports 11 in which is journaled a shaft 12 carrying on its left end a chart drum 13. This chart drum is adapted to be driven by a motor (shown only in Fig. 6 as Mc), which is located within the housing 10, through a vertical worm 14 engaging a wormwheel 15 fixed to the shaft 12. (See Figs. 2 and 3). The right-hand end of the chart drum is provided with a circumferential slot 16 extending substantially around the drum and equal in length to the sensitometer film strip F, the density of which is to be measured. As clearly shown in Fig. 5, this slot is slightly narrower than the width of the test strip to be measured, and a pair of overhanging film guides 17, extending around the drum adjacent the slot, are adapted to engage the margins of the film strip F and overhang the surface thereof to locate and hold the sensitometer film strip in wrapped relation on the drum and in covering relation with the slot 16. For loading the test strip, each of the film guides 17 is provided with opposed cut-out portions 18 (Fig. 4) into which the two ends of the strip are inserted under the film guides and pushed in opposite directions around the drum until the strip is flush with the drum surface. If desired, spring clips (not shown) can be located at opposite ends of the film guides and under which the opposite ends of the test strip will be positioned as it is fed into the cut-out portions 18. In its loaded position, the test strip F will take the position shown in Fig. 5 and the least-dense end of the same will come into the measuring light beam first as the drum is rotated, as will be fully described hereinafter.

Figure 7:
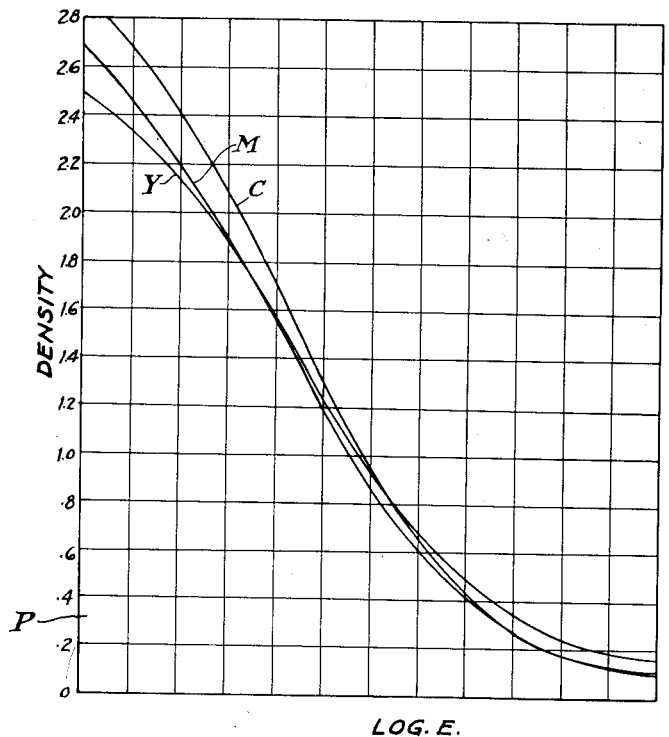
Fig. 7 is a diagrammatic representation of the type of graph obtained with this densitometer when using a sensitometer strip of a continuous nature.

A sheet of graph, or chart, paper P of the type shown in Fig. 7 is adapted to be held in wrapped relation on the left-hand end of the drum by any suitable means, such as a double-ended spring clip 20 extending longitudinally of the drum surface and under opposite fingers of which opposite ends of the chart are adapted to be frictionally held, see Fig. 4A. As shown, this chart includes one coordinate, i. e., the abscissa, calibrated in log E values corresponding to that of the sensitometer strip F to be placed over the slot in the drum for measurement, while the other coordinate is calibrated in density values. The chart is located on the drum with the abscissa or log E scale remote from the slot 16 and extending around the drum and with the end of that scale aligned axially of the drum with the minimum density end of the test strip F. Accordingly, the density scale of the chart extends longitudinally of the drum and toward the slot 16. Thus, as the drum rotates to move the sensitometer strip progressively through the measuring light beam, corresponding points on the log E scale of the chart are moved past a point on the drum axially spaced from the light beam along the drum.

Mounted on top of the housing 10 in alignment with the slot 16 is a means for directing a narrow beam of light through the slot 16 and the sensitometer strip F disposed in covering relation thereto. This means comprises a lamphouse 21 in which is situated a lamp 22, a mirror 23, behind the lamp, and a suitable condenser system (not shown) carried by an objective mount 24 slidably mounted in a tube on the forward side of the lamphouse for focusing purposes. The lamphouse may be cooled from beneath by a blower (not shown) mounted in the housing 10, the air exhausting through louvres in the top of the housing.

Within the chart drum and in alignment with the slot 16 and the light beam, there is a light-sensitive measuring cell 25. For the present embodiment, this cell is of the photo-voltaic type whose electrical output will vary directly with the amount of light striking the cell. However, with a suitable circuit, a light-sensitive cell of the type whose resistance varies with changes in the amount of light striking the same, could be used. The output of this measuring cell will vary and, in the present instance, tend to continually decrease as the sensitometer strip is moved through the light beam upon rotation of the drum. The variation in output of this measuring cell 25 from a given value is used to control the movement of a density wedge into the light beam to alter the intensity of the beam and keep it balanced at a constant value as the sensitometer strip moves therethrough, all as will be fully described hereinafter.

For measuring the color densities of a color film, it is necessary to interpose color filters into the light beam in front of the measuring cell 25, as is well known. The present instrument is designed to measure the color densities of a color film having magenta, cyan, and yellow dyes and, accordingly, the color filters available must include green, red, and blue. A neutral filter is also provided so that the neutral density of a color film may be obtained if desired, or, so that the instrument can be used solely for measuring the neutral density of black-and-white films. In the present instance, a filter drum 26 is rotatably mounted within the chart drum and includes red, green, blue, and neutral filters marked R, G, B, and N, respectively, in circumferential spaced relation. By indexing the filter drum through 90° at a time, the different filters are successively interposed in the light beam passing through the sensitometer strip and in front of the light-sensitive cell 25. (See Fig. 4.) When the magenta density of the color film is to be measured, the green filter will be interposed in the light beam since it serves to cut out the magenta rays and, likewise, in measuring the cyan density, the red filter is moved into the light beam, and for the yellow density, the blue filter is used. In measuring the neutral density of the color film, or a black-and-white film, the neutral filter is interposed in the light beam.

The filter drum is carried by a sleeve shaft 27, journaled in the inner one of the bearing supports 11 and rotatably surrounding the drum shaft 12, so that the chart drum 13 and the filter drum 26 can rotate relative to one another. The filter drum is driven by a motor Mf mounted on the top of the housing 10 and through a gearing including the pinion and spur-gear combination 28 and the worm 29 engaging a wormwheel 30 fixed to the end of the sleeve shaft 27.

For adjusting the intensity of the light beam so that the light-sensitive cell 25 will have a given output as the sensitometer strip F is moved through the light beam upon rotation of the drum, I move an elongated continuous neutral density wedge 31 through the light beam in front of the cell 25. As shown, this wedge is supported in a carriage 32 which is mounted on a guideway 33 to slide axially along the chart drum. A tongue-and-groove connection between the carriage and guideway, and indicated at 34 in Fig. 4, keeps the carriage from moving laterally. As the chart drum rotates the sensitometer strip through the light beam, the density wedge moves from its start position, shown in the drawings where the right-hand end thereof is in the light beam, to is final position where the left-hand end thereof is in the light beam. If the sensitometer strip is mounted over the slot 16 with its least-dense end in measuring position at the start of drum rotation, or measurement, then the wedge is mounted so that its most-dense end is in the light beam at the start and it moves to the right to continually reduce the density imposed on the light beam by itself. In other words, if the sensitometer strip moves in a direction such that its density increases as the drum rotates, then the wedge must move in a direction such that its density decreases in order to keep the intensity of the light beam striking the cell 25 balanced with a given value, or, to keep the output of the cell constant at a given value.

To do this in a rapid and efficient manner conducive to continuous movement of the sensitometer strip, I make use of a known type of electronic light-balancing system comprising a reversible motor whose direction and extent of drive is controlled by the output and polarity of a closed loop circuit including the measuring light-sensitive cell 25 and a standard bucking potential. This type of light-balancing system is disclosed in a publication entitled, "Instrument Technology," vol. I, No. 1, 1943, pp. 7-12, inclusive, published by the Brown Instrument Company, and, since it constitutes no part of the present invention per se but only in the combination of parts disclosed, it will be described herein only from the functional standpoint and not from the structural standpoint.

The principle of operation of this control is that it electrically amplifies the unbalanced voltage in the measuring closed loop circuit to provide energy necessary to operate a rebalancing motor which repositions the density wedge 31 to maintain the light balance. By this means not only is continuous balance achieved but also increased measuring sensitivity is gained. To secure the electrical amplification of the unbalanced D.-C. voltage in the measuring circuit, this control system first converts the D.-C. unbalance into an alternating voltage. This alternating voltage is then amplified in voltage and power by an electronic system to a value which can be used to drive a reversible motor connected to the density wedge. This control system, as applied to the present invention, is diagrammatically shown at the top of the electrical circuit shown in Fig. 6. The measuring circuit comprises the measuring light-sensitive cell 25 and a second, or standard, light-sensitive cell 35 of the photo-voltaic type connected in a closed circuit loop, as shown. The standard, or balancing cell 35 is illuminated by a lamp 36 whose voltage is maintained constant so that the output of this cell constitutes the standard or given value against which the measuring cell 25 is to be balanced. As shown in Fig. 6, the lamp 36 is preferably one of the low-voltage type and is supplied current from the A.-C. line through a reduction transformer T. The output of the measuring circuit is fed into a combined converter and voltage amplifier 37 and thence to a power amplifier 38. The current output of the power amplifier is then fed to one-phase winding of a two-phase reversible induction motor $M_w$, while the other phase winding of the motor is connected to the A.-C. power line. This motor is mounted in the housing 10 and is connected to the wedge carriage 32 by a pinion 39 and a rack 40 to drive the wedge back and forth across the light beam.

So long as the output of the light-sensitive cell 25 is equal to the given value determined by the output of cell 35, then no current will flow from the measuring circuit and the motor $M_w$ remains stationary. This condition indicates that the wedge 31 is in a position to balance the measuring beam to the given value and the position of the wedge designates the density of that portion of the sensitometer strip F in the light beam at that instant. As the sensitometer strip moves through the light beam, it continually tends to reduce the intensity of the beam below the value necessary to keep the measuring circuit in balance. As a result, the output of the standard cell 35 tends to predominate and the resulting flow of current from the measuring circuit to the amplifiers and motor $M_w$ is of such polarity as to cause the motor to drive the density wedge in a direction and to an extent such as to rebalance the measuring circuit.

After the chart drum 13 has made substantially a complete revolution the most-dense end of a sensitometer strip will have been positioned in the measuring light beam and the density wedge 31 will have been moved to the right to place the least-dense end thereof in the light beam to balance the intensity of the measuring beam against that of the standard lamp. Thus, before the chart drum can be allowed to start another revolution, or measurement, of another color density of the film strip, the filter drum must be indexed to the next color filter and the density wedge 31 must be returned to its start position. While this return movement of the switch may be accomplished in a number of different ways, I have shown it accomplished by throwing the measuring circuit out of balance in the proper direction to cause the balancing motor $M_w$ to drive in a direction to move the wedge back to its initial or start position.

To this end, I show a shutter 41 which is normally moved out of the beam of the standard lamp 36 by a spring 42 and is adapted to be moved into a cut-off position in the beam when a magnet 43 is energized. I also connect a low-voltage lamp 44 in circuit with the magnet 43 and which lamp is adapted to illuminate the measuring cell 25 but not the standard cell 35. (See Fig. 6.) The circuit of the magnet 43 and lamp 44 is controlled by a normally closed switch 45 of relay 46, the circuit of which is in turn controlled by a cam-operated switch 47. This switch 47 is normally closed and is opened by a cam 48 on sleeve 49 fixed to the drum shaft 12 when the chart drum has substantially completed one revolution and when it is stationary in its start position. Thus, while the chart drum is rotating, the relay 46 is energized to hold switch 45 open and the circuit to lamp 44 and magnet 43 is broken so that the lamp 44 has no effect on the measuring circuit and the shutter 41 is moved out of the beam of the standard lamp 36 by spring 42. As soon as the chart drum has substantially completed one revolution, the switch 47 is opened by cam 48 and the coil of relay 46 is deenergized. At this time the chart motor $M_c$ stops, as will be hereinafter set forth, and allows switch 45 to close and energize magnet 43 in lamp 44. This condition will exist until the chart drum motor $M_c$ is again started to make a density measurement of another color whereupon the cam 48 will move out from under the contact of switch 47, allowing it to close so that the relay 46 is energized to break the circuit to lamp 44 and magnet 43. When the wedge 31 is fully returned to its start position, a bracket 50 on the carriage thereof comes against a stop 51 on the top of the housing 10 and this engagement will hold it against any tendency of the motor $M_w$ to drive it beyond this point.

After the chart drum has been given one rotation to measure the density of the sensitometer strip F for one color, the filter drum 26 must be indexed 90° to bring the next color filter into the light beam so that the strip can again be moved through the light beam to test its density as to another color. This indexing of filters is accomplished while the chart drum is stationary and while the density wedge is being returned to its initial or start position. This sequence of operations must be repeated three times to measure each of the magenta, cyan, and yellow densities of a color film, and once to remove the neutral film into and out of position, whether or not a neutral density measurement is required of each test strip along with the three-color density measurements. Also, if it is desired to measure only the neutral density of a black-and-white film, it is not desirable to have to go through the cycle for the three-color filters in order to reach the neutral filter. In Fig. 6 I have shown a control circuit for the three motors whereby it is only necessary for the operator to press a start switch once after loading a new sensitometer strip and chart onto the drum and thereafter the density of the strip for each of the three colors will be automatically made in succession and the neutral filter will be moved into and out of position without causing a rotation of the drum. The control circuit also allows the neutral density of a black-and-white film strip to be measured, if desired, without going through the cycle of operation for each color filter.

The control circuit depends upon the presence of cams associated with each of the shafts 12 and 27 driven by the chart and filter motors $M_c$ and $M_r$ respectively. On the sleeve 49 fixed to the shaft 12, there is a cam 52 which is substantially diametrically disposed with respect to cam 48 which operates switch 47, as above described. On a sleeve 53 fixed to the sleeve shaft 27 driven by the filter motor $M_r$, there are four cams R, G, B, and N, spaced 90° relative to one another. These cams control the indexing cycle of the filter drum and are marked R, G, B, and N to correspond to the red, green, blue, and neutral filters carried by the filter drum. In Fig. 6 I have diagrammatically shown the control cams for each of the motors $M_c$ and $M_r$ in direct association with the motor with which they are associated and in the geometrical relationship they assume to control the desired timing of the circuit.

Referring now to Fig. 6, the cycle of the operation of the instrument will be described. It should be pointed out that when the machine stops, after making a density measurement of a color film, the neutral filter N of the filter drum is in the light beam and both the chart motor $M_c$ and the filter motor $M_r$ are stopped in the positions shown wherein the cam 52, associated with motor $M_c$, moves the contact arm 55 of a double pole switch 56 into contact with pole 57 thereof, while the cam N, associated with the filter drum motor $M_r$, moves the contact arm 58 of double pole switch 59 into contact with pole 60 thereof. The contact arm 58 of switch 59 is connected to the hot side of a 110-v. A.-C. power line by lead 61. The pole 60 of switch 59 is connected with the contact arm 55 of switch 56 by a lead wire 62. Also, in the rest position of the instrument the movable contact 63 of the stepping relay 64 is in the dotted-line position shown where it is in contact with the last or #5 contact of said relay.

After a sensitometer strip and a sheet of chart paper have been placed on the drum 13 and the line switch S has been closed, the device is ready to be started. If it is desired to measure the color density of the test strip on the drum, the double-pole, double-throw switch 66 is first thrown to the right hand position as shown in Fig. 6. Now to start the instrument, the hand switch 67 is momentarily closed. This closes the circuit to the reset coil 68 of the stepping relay 64 through the switch 66 and lead 69 and causes the relay to be reset, in which position the contact arm 63 thereof moves into engagement with the first, or #1 contact. The other side of the reset coil 68 is connected to a return line 71 by lead 72.

Now that the stepping relay is reset, the circuit to the filter motor $M_r$, including lead 61, switch contacts 58 and 60 of switch 59, contacts 55 and 57 of switch 56, lead 73, switch 66, lead 74, movable contact arm 63 of stepping relay 64 and lead 75 to the motor $M_r$, is completed so that the filter motor starts to index the filter drum. The other lead 76 of the motor $M_r$ is connected to the return lead 71. Immediately after the motor $M_r$ starts to drive, the contact arm 58 of switch 59 will drop off of the cam N, associated therewith, and will snap into engagement with pole 77 of switch 59 to connect the filter motor directly into the line, independent of switch 56 and stepping relay 64.

The filter motor $M_r$ will continue to drive in the direction of the arrow until the next cam R moves into engagement with contact arm 58 of switch 59 and moves it back into engagement with pole 60 of the switch. This 90° movement of the shaft, driven by motor $M_r$, will have indexed the neutral filter out of the measuring light beam and the red filter into the beam. When the cam R has reached this position, the motor $M_r$ will stop because the chart motor $M_c$ has previously been started to move cam 52 from engagement with contact arm 55 of switch 56, allowing it to contact pole 78 of the switch.

Starting of the chart motor $M_c$ during the final indexing movement of the filter motor shaft is brought about by cam R engaging movable contact 79 of switch 80 and moving it into engagement with pole 81 of this switch. Since the movable contact arm 79 of switch 80 is connected to the hot side of the power line by leads 82 and 98', current now passes through lead 84 and the switch 85 of the latching relay 86, then through the lead wire 87, the normally closed relay 88 and leads 89 and 90 to the chart motor $M_c$. The other lead 91 of the chart motor is connected to the return line 71. The coil of relay 88 will be momentarily deenergized to permit this feed of power to the chart motor because the feed to the coil of the relay is broken when movable contact 79 of switch 80 is moved from pole 92 of switch 80 by cam R. This momentary feed of power to the chart motor is sufficient to get the cam 52, associated therewith, out from under the movable contact 55 of switch 56, whereupon power is then directly fed to motor $M_c$ through line 61, switch 58, line 59, switch 56, and line 90. Feed to the motor $M_c$ through line 89 is broken in the meantime when relay 88 becomes energized by movement of contact arm 79 into engagement with pole 92 of switch 80 to energize the coil of relay 88. At the same time, movement of contact 79 of switch 80 into engagement with pole 81 applies current to the stepping coil 93 of relay 64 causing the movable arm 63 of this relay to be stepped to contact #2 thereof. The chart motor $M_c$ will now make one revolution and the density of the cyan dye in the sensitometer film strip will be measured because the red filter is in position.

After the chart drum makes one revolution, the cam 52 again engages movable contact 55 of switch 56 and moves it from pole 78 to pole 57.

This cuts the feed off of chart motor $M_c$ and causes it to stop and, at the same time, completes the circuit to the filter motor $M_f$ through line 73 and stepping relay 64 to start this motor to index the green filter to operative position. As above described, the filter motor will continue to run until the cam G engages movable contact 58 of switch 59 to stop the motor with the green filter in operative position in the measuring light beam. Also, as above described, just before the filter drum reaches its indexed position, the cam G will momentarily engage and move contact 79 of switch 80 into engagement with pole 81 to apply power to chart motor $M_c$ to move cam 52 from engagement with contact 55 of switch 56 and also step the movable arm 63 of stepping relay 64 to contact #3. This cycle of steps will be repeated until the sensitometer strip has been moved through the measuring light beam with each of the green and blue filters in the light beam to measure the color density of the magenta and yellow dyes of the film, respectively.

After the three-color densities of the sensitometer strip on the drum have been measured, it is necessary to index the neutral filter on the filter drum into operative position and set the circuit for a new start without causing the chart drum to rotate because ordinarily the neutral density of a color film is not desired. This is accomplished when the movable contact 63 of stepping relay 64 is moved to contact #4 of the relay upon the blue filter being indexed into operative position. Now, when the chart drum completes its rotation with the blue filter in place and cam 52, associated therewith, moves contact 55 of switch 56 to the position shown in Fig. 6, current is fed through the contact #4 of the relay 64 and lead wire 95 to the latching coil 96 of latching relay 86. This causes latching relay 86 to pull into its latched position and close switch 97 thereof and open switch 85 thereof. Opening of switch 85 breaks the feed circuit to the chart motor $M_c$ controlled by switch 80 so that as the neutral filter moves into operative position and cam N, associated with the filter shaft, moves contact arm 79 of switch 80 into engagement with pole 81, it will not start the chart motor $M_c$ but will merely cause a momentary energization of stepping coil 93 to step the movable contact 63 of stepping relay 64 to contact #5 thereof. When switch 97 of latching relay 86 is closed, the filter motor $M_f$ is fed current through lead lines 98, switch 97, and lead line 75.

Stepping of movable contact 63 of relay 64 to contact #5 thereof takes place when the N cam engages the switch arm 79 as the neutral filter approaches its operative position. When the neutral filter reaches its operative position, cam N moves movable contact 58 of switch 59 to the position shown in Fig. 6 whereupon current is fed through switches 59, 55, and contact #5 of stepping relay 64 to the unlatching coil 98 of latching relay 86 whereupon switch 97 returns to its normal open position and switch 85 returns to its normally closed position. Opening of switch 97 cuts off current from the filter motor $M_f$ and it stops with the neutral filter in operative position and with cam N engaging arm 58 of switch 59, as shown in Fig. 6. In this position, the two motor circuits are open and the chart and filter motors remain stationary, but the complete circuit is reset so that the complete cycle can be again started by merely pushing the start switch 67 which causes the stepping relay to be reset to contact #1.

If it is only desired to use this instrument for measuring the neutral density of a black-and-white film, it is merely necessary to throw the double-pole, double-throw switch 66 in the opposite direction, or to the left-hand position. Then, when the switch 67 is pulsed, current is fed directly through switch 66 and lines 99 and 90 through the chart motor $M_c$ to start it. Just as soon as the motor $M_c$ starts and the cam 52 moves away from contact 55 of switch 56, then current is fed to the motor $M_c$ through line 61, switch 59, lines 62 and 90, and switch 56 controls the motor circuit. Then, as soon as the drum has made a complete revolution, the cam 52 opens switch 56 and the chart motor stops. When measuring only the neutral density of a black-and-white film, it is not necessary to index the different color filters into the light beam, and throwing the double-pole double-throw switch 66 to this second position makes it possible to drive the chart motor independently of the filter motor $M_f$. The instrument is always ready for black-and-white use because it always stops with the neutral filter in the measuring light beam.

For plotting the density values determined by the instrument directly on the chart paper on the drum, I mount a stylus mechanism directly on the carriage of the density wedge to move along the axis of the drum as the wedge is moved to keep the photoelectric measuring circuit in balance. So that the density measurements for the different colors can be readily distinguished on the completed chart, I provide a multiple stylus arrangement including individual styli corresponding in color to the color density being measured and which are indexable into operative position, in accordance with the color filter in operative position.

Figure 3:
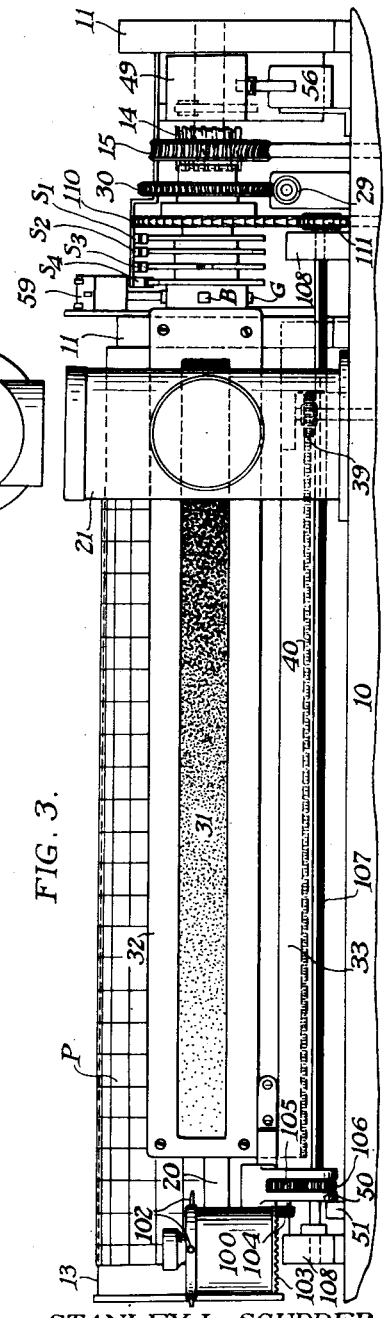
Fig. 3 is a front elevation of the parts above the base of the densitometer shown in Fig. 1.

Referring now to Figs. 1, 2, and 3, a preferred form of stylus mechanism comprises an inkwell 100 rotatably mounted on the bracket 50 fixed to and extending from the end of the density wedge carriage 32. This inkwell is divided into four separate compartments—one containing red ink, another blue, another yellow, and the fourth black ink. The cover of the inkwell may be marked in color quadrants to help in indexing the device relative to the color filters, as will be hereinafter described. Extending into each compartment of the inkwell is a fine, right-angle, capillary tube 102 which serves to feed the ink onto the chart paper by capillary attraction and the marking end of each of which is adapted to rub on the surface of the chart paper on the drum. It will be readily appreciated that the styli can take any one of a number of different forms, such as colored pencils, conventional pens, etc., but I have found that the capillary tube-type pen is preferable, since they will not dry up and fail to mark the instant the pen hits the paper after being exposed to air in an inoperative position for some time, as is characteristic of this instrument. The inkwell is so disposed relative to the density wedge and chart on the drum that when the wedge and sensitometer strip on the drum are in their start positions, and the measuring circuit is in balance, the stylus in operative position will indicate a density on the chart which is equal to that of the first portion of the sensitometer strip. Thereafter, the position of the density wedge will correspond to the density of the sensitometer strip and the stylus will mark the correct density value on the chart corresponding to the log E scale which moves in accordance with the test strip on the drum.

For indexing the inkwell to bring the proper colored stylus into operative position, the following mechanism is provided. Fixed to the bottom of the inkwell is a crown gear 103 adapted to be driven by a gear train including pinion 104 and meshing gears 105 and 106 all supported by the bracket 50. The gear 106 is in driving connection with a square rod 107 extending parallel to the density wedge and supported in bearings 108 on the top of the housing. The right-hand end of the rod 107 carries a sprocket 109 which is connected to a sprocket 110 fixed to the sleeve shaft 27 on which the filter drum is mounted by a chain 111. As shown in Fig. 1, the chain 111 passes down into the housing where it travels over a guide means (not shown) before coming up through the top of the housing again to engage the sprocket 109. The gear ratio of the drive from the sleeve shaft 27 to the inkwell 100 is such that when the filter drum is indexed 90° to change filters in the light beam, the inkwell 100 is indexed 90° to bring another stylus into operative position relative to the surface of the drum. The inkwell is arranged so that when the magenta density of the film is being measured, the red pen is in operative position, and when the cyan density is being measured, the blue pen is in operative position, etc., so that it is easy to correlate the three curves on the charts with the color densities they refer to.

Figure 8:
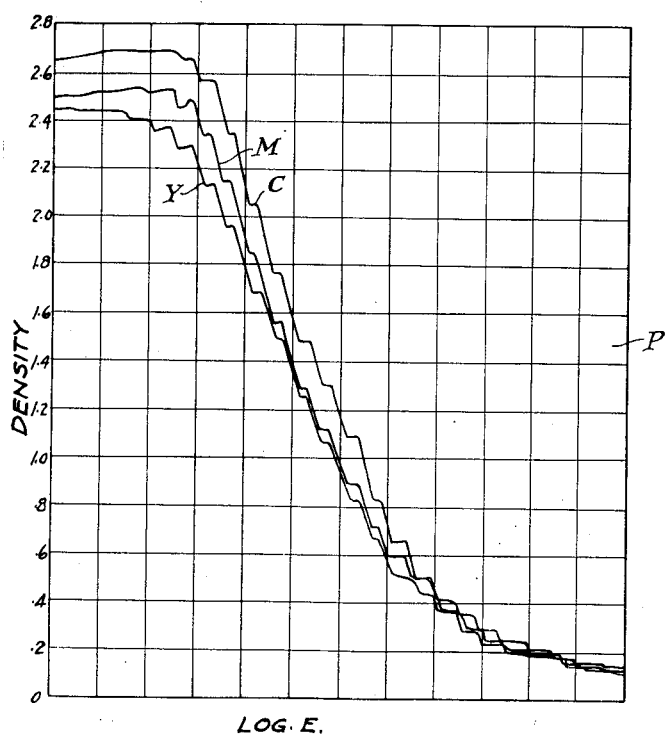
Fig. 8 shows the type of graph obtained with this densitometer when using a sensitometer test strip of the "step" type.

In Figs. 7 and 8, I have shown two forms of characteristic sets of curves which are obtained by the use of this instrument. The curves shown in the chart of Fig. 7 are smooth curves which would be obtained by using a sensitometer strip of film having a continuously progressive exposure along its length. The curves of the type shown in Fig. 8, on the other hand, would be obtained if the sensitometer strip of film used was of the step-tablet type where the different given exposures extend along given lengths of strip. In other words, each of the horizontal portions in the curves shown in Fig. 8 indicates the density of a particular step on the sensitometer strip.

Inasmuch as the red, green, blue and neutral filters possess different density characteristics, when they are moved into the measuring beam of light they will affect the intensity of the beam differently. To overcome this difficulty, and to permit the photoelectric measuring circuit to be balanced when the density wedge is in its start position regardless of which filter is in position, I vary the intensity of the comparison light 36, and consequently the output of the comparison cell 35, in accordance with the color filter in the light beam. To this end I provide four adjustable resistances $R_1$, $R_2$, $R_3$, and $R_4$ which can be selectively cut into the circuit of the standard lamp 36 to alter its intensity and consequently adjust the output of the standard cell 35 in the measuring circuit. Each of these resistances is cut into the lamp circuit by one of four switches, $S_1$, $S_2$, $S_3$, and $S_4$, which are, in turn, controlled by four cams $C_1$, $C_2$, $C_3$, and $C_4$, fixed to the sleeve shaft 27 carrying the filter drum. (See Figs. 2, 3, and 6.) Each of the resistances corresponds to a different one of the color densities to be measured including neutral, and are each initially adjusted so as to vary the intensity of the comparison light source 36 when inserted into the lamp circuit to correct for the discrepancies in their density characteristics at a given log E. Now, if $R_1$ is to correct for the red, $R_2$ the green, $R_3$ the blue, and $R_4$ the neutral, the cams $C_1$, $C_2$, $C_3$ and $C_4$ are so disposed relative to the filters in the filter drum that when the red filter is in position for measurement of the cyan density, the cam $C_1$ allows switch $S_1$ to close and connect resistance $R_1$ into the circuit of the comparison lamp 36. Accordingly, when the filter drum is indexed to bring the green filter into position for the measurement of the magenta density, the cam $C_1$ opens switch $S_1$ to cut out resistance $R_1$ and cam $C_2$ allows switch $S_2$ to close and connect resistance $R_2$ into the circuit of the comparison lamp. This sequence of steps follows with each revolution of the chart drum and indexing movement of the filter drum, so that when the yellow density is being measured, the resistance $R_3$ is cut into the lamp circuit, and when the neutral filter is in operative position, the resistance $R_4$ is in the lamp circuit.

So that the toe of all the curves can be shifted together along the density coordinate of the chart to start them at or near the zero point, and to take care of discrepancies in the initial positioning of the density wedge and stylus at their start positions, I provide an adjustable resistance $R_5$ which is connected into the circuit of the comparison lamp 36 at all times, or with each of the four resistances, $R_1$, $R_2$, $R_3$, and $R_4$. (See Fig. 6.)

During the time that the chart drum is stationary, and the filter drum is indexing, and the density wedge is returning to its start position, it is desirable to reduce the voltage on the comparison lamp 36 to prevent it from burning out, or deteriorating too fast. To this end a double-pole switch 115 of the relay 46 is connected into the feed circuit of the stepdown transformer T supplying power to the low voltage comparison lamp 36. When the chart drum is rotating and a density measurement is being made, the switch 47 will be closed, relay 46 will be energized to pull movable contact 116 of switch 47 into engagement with pole 117 and connect the switches $S_1$, $S_2$, $S_3$, and $S_4$, as well as resistance $R_5$ in circuit with the transformer T feeding lamp 36. However, just before the drum completes a revolution and stops, the cam 48, associated with the drum, engages and opens switch 47 whereupon the relay 46 is deenergized. This allows the movable contact 116 of switch 47 to engage pole 118 whereupon the transformer T is connected to the hot side of the power line through rheostat 119 and lead line 120, so that the lamp 36 is dimmed by the introduction of rheostat 119 into its feed circuit. It might be pointed out that it is not practical to completely extinguish comparison lamp 36 during the time the chart drum is stationary because its intensity is not stable until it reaches a given operating temperature.

Referring to Fig. 6, it will be noticed that the cam 48, associated with the chart drum and controlling switch 47, is somewhat longer than cam 52 and is disposed so as to open the switch 47 near the end of the revolution of the drum and before it stops. This is possible because the chart paper does not extend completely around the drum, but there is a portion of the drum that extends between the ends of slot 16 where no density measurement is being made. Accordingly, the switch 47 is opened at the instant the end of the slot 16 passes out of the measuring light beam so that the density wedge may be returned to its start position during the time the drum is completing its revolution.

In order to review the complete operation of this densitometer, let us assume that it is desired to measure the color densities of a sensitometer strip of a color film. First, the light switch S is closed and the double-pole, double-throw switch 66 is thrown to the position shown in Fig. 6. Then, after the sensitometer strip F is loaded into position on the chart drum 13 in covering relation with the slot 16, and the chart paper is wrapped around the drum, all the operator has to do is pulse the starting switch 67. This causes resetting of relay 64 and starts the filter drum motor Mf to index the red filter into position. Just before the red filter is completely indexed into position in the measuring light beam and stops because cam R actuates switch 59, the cam R will operate switch 80 to start the chart drum motor Mc and step relay 64 to contact #2 thereof. When the chart drum starts to rotate, the cam 48 will allow switch 47 to close and energize relay 46, whereupon the comparison lamp 36 is placed in circuit with the switches S1, S2, etc., and the shutter 41 will be removed from in front of the lamp 36 while auxiliary lamp 44 will be extinguished so that the photoelectric measuring circuit is in condition to balance the intensity of the measuring light beam against the output of the comparison beam by causing adjustment of the density wedge across the measuring light beam and along the drum axis.

Accordingly, as the drum continues to rotate the sensitometer strip through the light beam the density wedge will be moved to an extent and at a rate such as to continuously balance the output of the measuring circuit and will thus cause the stylus connected thereto to plot the density curve on the chart paper. Just before the drum completes one revolution and as the end of the slot 16 passes from the beam of measuring light, the cam 48 will open switch 47 and break the circuit to relay 46. This allows switch 45 to close and energize magnet 43 to pull shutter 41 in front of the comparison light source and at the same time illuminate auxiliary lamp 44 which shines on measuring cell 25. This unbalances the photoelectric measuring circuit in a direction to cause the motor Mw to drive the density wedge back to its start position. At the same time de-energization of relay 46 allows switch 115 to reverse and connect the rheostat 119 in circuit with the lamp 36 to dim it.

As the drum completes one revolution, the cam 52, associated therewith, reverses switch 56 to cut off power from the chart motor Mc and causes power to be applied to the filter motor Mf to index the green filter into position. This complete cycle is automatically repeated until the sensitometer strip has been measured for each of the three-color densities in succession. Then the stepping relay 64 reaches contacts #4 and #5 in succession so that the filter drum may index the neutral filter into position and reset the circuit for a new cycle without causing a rotation of the chart drum. The instrument is now in condition for the measurement of another sensitometer strip F by mere operation of the start switch 67 and the chart with the three-color densities of the previously used test strip is finished and can be removed from the drum.

Should the operator desire to use the instrument for measuring and plotting the neutral density of a black-and-white film, it is only necessary to reverse the double-pole, double-throw switch 66. Now, when the start switch 67 is pulsed, the chart motor Mc starts immediately and continues to operate until one revolution is completed whereupon cam 52 opens switch 55 and stops the chart motor. In this case, the filter drum motor does not operate.

Because of the continuous nature of the balancing feature of the photoelectric measuring circuit used, this densitometer is capable of measuring the density of a continuously moving sensitometer strip. Furthermore, the operative association of this type of balance control with a movable density wedge and chart moving with the sensitometer strip makes it possible to plot the density curves directly and continuously. In addition, the control circuit is such that the only work required by an operator in measuring the three-color densities of a color film is to load the sensitometer strip and chart on the drum and push a start switch. All of these features in combination result in a densitometer which is particularly adapted for use in the production control of color prints where speed is required and is also adapted for use by unskilled labor. It might be pointed out that with this densitometer, the three-color densities of a color film can be obtained in plotted form in less than two minutes which is considerably faster than any existing equipment the inventor is aware of.

Although I have shown and described certain specific embodiments of my invention, I am fully aware that many modifications thereof are possible. My invention, therefore, is not to be limited to the precise details of construction shown and described but is intended to include all modifications coming within the scope of the appended claims.

Having thus described my invention, what I claim is new and desire to secure by Letters Patent of the United States is:

1. An automatic plotting densitometer for measuring the density of successive points along a sensitometer strip and plotting the values against the log E (exposure) of the strip at these points and comprising a light-sensitive cell; means for directing a beam of light onto said cell; means for moving said sensitometer strip continuously at a known rate across said light beam and in front of said cell; means for varying the intensity of said light beam; means responsive to a deviation of the cell output from a given value for adjusting said last-mentioned means until the output of said cell returns to said given value, whereby the adjusted position of said intensity varying means is an indication of the density of the point on the strip in the light beam; means for supporting a chart having its coordinates marked in values of density and log E values corresponding to those of the sensitometric strip to move in a direction such that the log E coordinate moves past a given plane which is parallel to the density coordinate; means for locating said chart on said supporting means so that at any instant the log E value on said chart passing said given plane corresponds to the log E value of the point on said sensitometer strip passing said light beam; means for moving said chart supporting means continuously and in synchronism with said sensitometer strip; a stylus engageable with said chart and mounted to move in a plane parallel to said above-mentioned plane; and a driving connection between said stylus and said intensity varying means, whereby the position of the stylus along the density coordinate of the chart corresponds to the density for successive points on the sensitometer strip.

2. A plotting densitometer according to claim 1 in which the means for varying the intensity of the light beam comprises a continuous neutral density wedge movable across the light beam in front of the cell.

3. An automatic plotting densitometer for measuring the color density of successive points along a sensitometer strip of color film and plotting the values against the log E of the strip at these points and comprising a light-sensitive cell; means for directing a beam of light onto said cell; means for moving said sensitometer strip continuously at a known rate across said light beam and in front of said cell; a filter holder including a plurality of color filters each being substantially complementary in color to a different one of the colors in the film strip to be measured, means for indexing said filter holder to move different ones of said color filters into said light beam in front of the cell; means for varying the intensity of the light beam, and movable from an initial position for a density measurement of each color; means responsive to a deviation of the cell output from a given value for adjusting said last-mentioned means until the output of said cell returns to said given value, whereby the adjusted position of said intensity varying means is an indication of the density of the point of the strip in the light beam; means for supporting and moving a chart having its coordinates marked in values of density and log E, at a speed and in a direction such that the log E coordinate moves past a given plane which is parallel to the density coordinate commensurate with the movement of the sensitometer strip across the light beam; a stylus engageable with said chart and mounted on a support to move in a plane parallel to said above-mentioned plane; said stylus including a plurality of points corresponding in number and color to said color filters and being indexably mounted on its support so that different ones of its points can be moved into position to engage said chart; means for automatically momentarily stopping said chart and sensitometer film strip when the full length of the strip has been moved through said beam and returning each of them to their initial position; means for returning said intensity varying means to its initial position while the sensitometer strip is stopped; and means for automatically indexing said filter holder to bring another color filter into the light beam and again starting movement of the sensitometer strip and chart; and means for indexing said stylus at the time the filter holder is indexed so that the stylus point engageable with the chart will make a trace corresponding in color to the filter in the light beam.

4. An automatic plotting densitometer according to claim 3 including an interlocking control means between said means for driving the chart, said sensitometer strip, said intensity varying means and said means for indexing the filter holder such that the same sensitometer strip will be automatically successively explored by a light beam of different colors until the filter holder has been indexed through its complete range whereupon the apparatus will stop and remain so until again started by manipulation of a start switch.

5. An automatic plotting densitometer for measuring the color density of successive points along a sensitometer strip of color film and plotting the values against the log E of the strip at these points and comprising a rotatable drum having one end provided with a circumferential slot; means for mounting the sensitometer strip in wrapped relation on said drum in superposed relation with said slot; a chart having a first coordinate calibrated in log E values corresponding to those of the sensitometer strip, and having the second coordinate calibrated in density values; means for holding said chart in wrapped relation on said drum and disposed so that said log E coordinate extends around said drum and has its log E values axially aligned on the drum with the corresponding log E exposure steps of the sensitometer strip; means for rotating said drum; means for projecting a beam of light through the slot in said drum and the strip covering it; a light-sensitive cell optically aligned with the beam passing through said strip; a plurality of color filters individually indexable into and out of said light beam; means for indexing said filters into and out of said light beam in succession; means for varying the intensity of said light beam; means responsive to the output of said cell deviating from a given value for causing an adjustment of said beam intensity varying means which will return the cell output to said given value, whereby the adjusted position of said intensity varying means in an indication of the density of the point of sensitometer strip in the beam at that instant; a stylus engageable with said chart and movable axially of said drum and along the density coordinate of said chart; and means connecting said stylus to said beam intensity varying means whereby the stylus is moved axially of the drum in accordance with the adjustments of said intensity varying means.

6. An automatic plotting densitometer according to claim 5 and including means for automatically stopping said drum after it has made one revolution, automatically indexing a different color filter into the beam in place of the one previously in the beam while the drum is stopped and then starting the drum up again, and automatically repeating this procedure until the sensitometric strip has been measured with each of said color filters in the light beam.

7. An automatic plotting densitometer according to claim 5 in which there are a plurality of styli corresponding in number and color to the color filters mounted on a support to move axially of said drum so as to be individually indexable into chart-engaging position; and means for indexing said styli into and out of operative position in synchronism and in correspondence with the indexing of said color filters into and out of the beam so that the color of the stylus in operative position will correspond to the color of the filter in the light beam during any density measurement.

8. An automatic plotting densitometer according to claim 5, in which the light beam intensity varying means comprises a longitudinal continuous density wedge movable axially of said drum across said light beam from a start position to a final position in balancing said light beam as the sensitometer strip moves from one end to the other through said light beam, said stylus being directly mounted on the support for said wedge to be moved axially of the drum and chart therewith.

9. An automatic plotting densitometer for measuring the color density of successive points along a sensitometer strip of color film and plotting the values against the log E of the strip at these points and comprising a rotatable drum having one end provided with a circumferential slot; means for mounting the sensitometer strip in wrapped relation on said drum in superposed relation with said slot; a chart having a first coordinate calibrated in log E values corresponding to those of the sensitometer strip; and having a second coordinate calibrated in density values; means for holding said chart in wrapped relation on said drum and so disposed that said first coordinate extends around said drum and has one end substantially axially aligned on the drum with one end of the sensitometer strip; a motor for driving said drum; means for projecting a beam of light through the slot in said drum and the strip covering it; a light-sensitive cell optically aligned with the beam of light passing through said strip; a plurality of color filters individually indexable into and out of said light beam; means for indexing said filters into and out of said light beam in succession and including a motor; a longitudinal continuous density wedge movable axially of said drum across said light beam from a start position to a final position to vary the intensity of said beam in order to keep the output of said cell at a given value as the sensitometer strip is moved through the light beam, whereby the position of the wedge at any instant is a measure of the density of the portion of the strip in the beam at that instant, means responsive to the output of said cell deviating from said given value for driving said wedge in a direction and to an extent to vary the intensity of said beam to return the cell output to said given value; a stylus engageable with said chart and movable axially of said drum with said wedge; a common interlocking control circuit for said drum and filter indexing motors including a pair of cam-operated switches, so arranged that the two motors cannot operate at the same time, the drum motor stops after the drum makes one revolution whereupon the filter indexing motor starts and continues to operate until a different filter is indexed into position whereupon the motor stops and the drum motor again starts; and means for automatically returning said wedge to its start position each time the drum motor stops and during the indexing operation of the color filters.

10. An automatic plotting densitometer for measuring the color density of successive points along a sensitometer strip of color film and plotting the values against the log E of the strip at these points and comprising a rotatable drum having one end provided with a circumferential slot; means for mounting the sensitometer strip in wrapped relation on said drum in superposed relation with said slot; a chart having a first coordinate calibrated in log E values corresponding to those of the sensitometer strip; and having a second coordinate calibrated in density values; means for holding said chart in wrapped relation on said drum and so disposed that said first coordinate extends around said drum and has one end substantially axially aligned on the drum with one end of the sensitometer strip; a motor for driving said drum; means for projecting a beam of light through the slot in said drum and the strip covering it; a light-sensitive cell optically aligned with the beam of light passing through said strip; a plurality of color filters individually indexable into and out of said light beam; means for indexing said filters into and out of said light beam in succession and including a motor; a longitudinal continuous density wedge movable axially of said drum across said light beam from a start position to a final position to vary the intensity of said beam in order to keep the output of said cell at a given value as the sensitometer strip is moved through the light beam, whereby the position of the wedge at any instant is a measure of the density of the portion of the strip in the beam at that instant, means responsive to the output of said cell deviating from said given value for driving said wedge in a direction and to an extent to vary the intensity of said beam to return the cell output to said given value; a stylus engageable with said chart and movable axially of said drum with said wedge; a common interlocking control circuit for said drum and filter indexing motors including a pair of cam-operated switches, so arranged that the two motors cannot operate at the same time, the drum motor stops after the drum makes one revolution whereupon the filter indexing motor starts and continues to operate until a different filter is indexed into position whereupon the motor stops and the drum motor again starts; and means for automatically returning said wedge to its start position each time the drum motor stops and during the indexing operation of the color filters, and means for automatically paralyzing the drum and filter indexing motor circuits when each of the color filters has been indexed into the light beam in succession, and a manual switch in the circuit which must be pulsed to again reset the circuit for an operating cycle.

11. An automatic plotting densitometer according to claim 9 in which said stylus comprises a plurality of styli corresponding in number and color to said color filters and individually indexable into operative position to engage said chart; and means for indexing said styli into operative position in synchronism and in correspondence with the color of the filter indexed into the light beam.

12. An automatic plotting densitometer according to claim 9 in which said stylus comprises a plurality of styli corresponding in number and color to said color filters and individually indexable into operative position to engage said chart, the indexing means of said styli being mechanically connected with the indexing means of said color filters, whereby when one of the color filters is indexed into the light beam, the stylus of corresponding color is indexed into operative position.

13. An automatic plotting densitometer according to claim 5, and including individual selective means for adjusting the intensity of the light beam so that the output of the light-sensitive cell with no sensitometer strip in position will be substantially the same with each of the different color filters positioned in the beam; and means for automatically introducing the proper selective means in accordance with the color filter indexed into the beam.

14. An automatic plotting densitometer according to claim 5, including a plurality of individual resistances adapted to be individually and successively introduced into the circuit of a light source forming a part of the means for producing said beam of light and each corresponding to one of the color filters and adjusted so that the output of said cell with each of the filters in the beam in the absence of the sensitometer strip will be substantially the same; and means for successively introducing the resistances at the same time and in correspondence with the indexing of the color filters into and out of the beam.

STANLEY L. SCUDDER.

REFERENCES CITED

The following references are of record in the file of this patent:

UNITED STATES PATENTS

| Number | Name | Date |
|---|---|---|
| 1,799,134 | Hardy | Mar. 31, 1931 |
| 1,806,197 | Hardy | May 19, 1931 |
| 2,076,553 | Drinker et al. | Apr. 13, 1937 |
| 2,244,362 | Hartig | June 3, 1941 |
| 2,376,311 | Hood | May 15, 1945 |
| 2,442,910 | Thomson | June 8, 1948 |

FOREIGN PATENTS

| Number | Country | Date |
|---|---|---|
| 587,119 | Germany | Oct. 30, 1933 |